(12) United States Patent
Blumhardt

(10) Patent No.: US 10,480,839 B2
(45) Date of Patent: Nov. 19, 2019

(54) REFRIGERANT COMPRESSOR

(71) Applicant: Bitzer Kuehlmaschinenbau GmbH, Sindelfingen (DE)

(72) Inventor: Rolf Blumhardt, Weil der Stadt (DE)

(73) Assignee: Bitzer Kuehlmaschinenbau GmbH, Sindelfingen (DE)

( * ) Notice: Subject to any disclaimer, the term of this patent is extended or adjusted under 35 U.S.C. 154(b) by 679 days.

(21) Appl. No.: 14/490,203

(22) Filed: Sep. 18, 2014

(65) Prior Publication Data
US 2015/0000315 A1 Jan. 1, 2015

Related U.S. Application Data

(63) Continuation of application No. PCT/EP2013/055645, filed on Mar. 19, 2013.

(30) Foreign Application Priority Data

Mar. 21, 2012 (DE) .......................... 10 2012 102 405

(51) Int. Cl.
F25B 49/02 (2006.01)

(52) U.S. Cl.
CPC ...... *F25B 49/022* (2013.01); *F25B 2400/077* (2013.01); *F25B 2500/07* (2013.01);
(Continued)

(58) Field of Classification Search
CPC ................ F25B 49/022; F25B 2500/27; F25B 2700/21151; F25B 2500/08; F25B 2700/05
See application file for complete search history.

(56) References Cited

U.S. PATENT DOCUMENTS

| 4,020,642 A | 5/1977 | Haselden et al. |
| 4,328,678 A * | 5/1982 | Kono ..................... G01K 3/005 374/E3.002 |

(Continued)

FOREIGN PATENT DOCUMENTS

| EP | 1 138 949 B1 | 4/2005 |
| EP | 1 134 520 B1 | 11/2005 |

(Continued)

OTHER PUBLICATIONS

Kibe, Refrigerating Device, Dec. 20, 2012, JP2012251706A, Whole Document.*

(Continued)

*Primary Examiner* — Larry L Furdge
(74) *Attorney, Agent, or Firm* — Reinhart Boerner Van Deuren P.C.

(57) ABSTRACT

In order to improve a refrigerant compressor comprising a drive motor and a compressor unit which compresses a refrigerant entering through a suction inlet and allows it to exit through a pressure outlet in such a way that it works as reliably as possible, it is proposed that the refrigerant compressor comprise a compressor monitoring system which is integrated into a compressor control system and which determines a compressor condition by means of a first condition value that corresponds to a first saturation temperature in the suction inlet and a second condition value that corresponds to a second saturation temperature in the pressure outlet, and which compares the compressor condition with permissible compressor conditions lying in a given deployment field of a deployment diagram and initiates a process of switching-off the refrigerant compressor if the compressor condition departs from the deployment field.

19 Claims, 10 Drawing Sheets

(52) U.S. Cl.
CPC ....... *F25B 2500/08* (2013.01); *F25B 2500/27* (2013.01); *F25B 2600/021* (2013.01); *F25B 2600/0271* (2013.01); *F25B 2600/0272* (2013.01); *F25B 2700/05* (2013.01); *F25B 2700/1931* (2013.01); *F25B 2700/1933* (2013.01); *F25B 2700/2105* (2013.01); *F25B 2700/21151* (2013.01); *F25B 2700/21152* (2013.01); *F25B 2700/21155* (2013.01); *F25B 2700/21156* (2013.01); *Y02B 30/741* (2013.01)

(56) References Cited

U.S. PATENT DOCUMENTS

| | | | |
|---|---|---|---|
| 5,806,327 | A | 9/1998 | Lord et al. |
| 5,884,494 | A | 3/1999 | Okoren et al. |
| 6,321,543 | B1 * | 11/2001 | Said .................. F25B 49/022 |
| | | | 62/156 |
| 6,418,740 | B1 | 7/2002 | Williams et al. |
| 7,451,061 | B2 * | 11/2008 | Saunders ................ F04B 51/00 |
| | | | 62/298 |
| 2002/0018724 | A1 * | 2/2002 | Millet .................. F04C 18/0215 |
| | | | 417/228 |
| 2002/0026803 | A1 | 3/2002 | Inoue et al. |
| 2002/0035842 | A1 * | 3/2002 | Suitou .................. B60H 1/3223 |
| | | | 62/228.3 |
| 2002/0127120 | A1 | 9/2002 | Hahn et al. |
| 2003/0077179 | A1 | 4/2003 | Collins et al. |
| 2004/0184930 | A1 | 9/2004 | Millet et al. |
| 2005/0235660 | A1 | 10/2005 | Pham |
| 2006/0075771 | A1 | 4/2006 | Tracey, Jr. et al. |
| 2009/0090118 | A1 | 4/2009 | Pham et al. |
| 2011/0110791 | A1 * | 5/2011 | Donnat ................ B60H 1/3232 |
| | | | 417/18 |
| 2014/0127067 | A1 | 5/2014 | Kienzle |

FOREIGN PATENT DOCUMENTS

| | | |
|---|---|---|
| JP | H07270003 A * | 10/1995 |
| JP | 2012251706 A * | 12/2012 |
| WO | WO 99/40325 A1 | 8/1999 |
| WO | WO 2010/011226 A1 | 1/2010 |

OTHER PUBLICATIONS

Tamura, Refrigerator, Oct. 20, 1995, JPH07270003A, Whole Document.*
Said et al., Method for Protecting Compressor, Oct. 10, 2001, JP2001280715A, Whole Document (Year: 2001).*
Dieter Schmidt, Lexikon Kältetechnik, Publication, 2008, 3 pages, C.F. Müller Verlag, Heidelberg, Berlin, Germany.

* cited by examiner

REFRIGERANT COMPRESSOR

CROSS REFERENCE TO RELATED PATENT APPLICATION

This application is a continuation of international application No. PCT/EP2013/055645 filed on Mar. 19, 2013.

This patent application claims the benefit of international application No. PCT/EP2013/055645 of Mar. 19, 2013 and German application number 10 2012 102 405.7 of Mar. 21, 2012, the teachings and disclosure of which are hereby incorporated in their entirety by reference thereto.

BACKGROUND OF THE INVENTION

The invention relates to a refrigerant compressor comprising a drive motor and a compressor unit which compresses a refrigerant entering through a suction inlet and allows it to exit through a pressure outlet.

Refrigerant compressors of this type are usually compressors known from the state of the art.

In refrigerant compressors of this type however, it is necessary to protect them from damage so that refrigerant compressors of this type should only be operated under permissible compressor conditions which are defined by a deployment field given in a deployment diagram.

For this reason, refrigerant compressors of this type are partly operated by an external monitoring system which is described for example, in the user manual issued by the company CAREL Industries HQs, Via del Industria, 35020 Brugine-Padova (Italy), Manual Version: 1.6 dated Aug. 24, 2009 with the title "Standard Chiller Modular HP 1/4 Generic/Bitzer screw compressor and CAREL valve, Application program for $pC0^1$, $pC0^2$, $pC0^3$".

However, a combination of a refrigerant compressor and an external monitoring system of this type brings with it a multiplicity of problems since the deployment field in the external monitoring system does not necessarily agree with the permissible compressor conditions of the refrigerant compressor.

Consequently, the working reliability of a refrigerant compressor of this type cannot be ensured.

Consequently, the object of the invention is to improve a refrigerant compressor of the type described hereinabove in such a way that it works as reliably as possible.

SUMMARY OF THE INVENTION

In accordance with the invention, this object is achieved in the case of a refrigerant compressor of the type described hereinabove in that the refrigerant compressor comprises a compressor monitoring system which is integrated into a compressor control system and determines a compressor condition by means of a first condition value that corresponds to a first saturation temperature in the suction inlet, and determines a second condition value that corresponds to a second saturation temperature in the pressure outlet, and which compares the compressor condition with permissible compressor conditions lying in a given deployment field of a deployment diagram and then causes the refrigerant compressor to switch off if the compressor condition leaves the deployment field.

The advantage of the solution in accordance with the invention is to be seen in that, due to the integration of the monitoring system into the compressor control system in the form of the compressor monitoring system, it is ensured that the permissible compressor conditions within the given deployment field always correspond to the compressor conditions as provided by the manufacturer since in this case, due to the integration of the compressor monitoring system into the compressor control system by the manufacturer, the deployment field can be preset with the permissible compressor conditions so that all the sources of error which can occur in the case of a combination of an external control system with a refrigerant compressor are avoided.

It is particularly expedient hereby, if the deployment field of the permissible compressor conditions is stored in a memory of the compressor monitoring system such as to be unchangeable by the user.

A further advantageous solution envisages that the deployment field incorporating the permissible compressor conditions be preset in the compressor monitoring system for the specific compressor.

This means that in this case, the manufacturer of the refrigerant compressor has the possibility of defining the deployment field specifically for the type of refrigerant compressor or for each individual refrigerant compressor and thus has the possibility of exhausting the possible compressor conditions on the one hand, but he also has the possibility of securely excluding critical compressor conditions and of doing it specifically for each type of refrigerant compressor or each individual refrigerant compressor on the other.

In particular, provision is made in one embodiment for the compressor control system to comprise a motor control system for the speed-regulatable drive motor, and for the compressor monitoring system for switching-off the refrigerant compressor to cooperate directly with the motor control system thereof so that sources of error attributable thereto which arise in the case of external control systems can also be avoided.

Up to this point, no details have been given in regard to the functioning of the compressor monitoring system.

The previously described solution of the compressor monitoring system has the disadvantage that this compressor monitoring system only becomes active and initiates the process of switching-off the refrigerant compressor either directly or with a time delay if over-stepping of the deployment field is already occurring.

In the course of the actual working time, this leads to a significant frequency of switching-off actions of the refrigerant compressor.

In order to reduce the frequency at which the refrigerant compressor is switched-off, provision is preferably made for the compressor monitoring system to determine the relative position of the determined compressor condition with reference to a deployment boundary enclosing the deployment field and makes the information about the relative position of the compressor condition available at a control interface for a higher-level control system of a coolant circulation system.

A higher-level control system can therefore intervene and try to hold the compressor condition in the deployment field before the deployment boundary is reached.

Up to this point, no details have been given in regard to the process of detecting the compressor condition within the deployment field.

Thus, one advantageous solution envisages that the compressor monitoring system determine the relative position of the determined compressor condition in the deployment field with reference to the deployment boundary by means of status zones which are defined in the deployment field and by virtue of the compressor monitoring system checking as to whether the compressor condition lies in one of these status zones or not.

Due to the sub-division of the deployment field into different status zones, the possibility is then provided in a simple manner of characterizing the particular compressor condition and thus of determining the extent of the danger of the compressor condition leaving the deployment field or whether the compressor condition will remain in a harmless area of the deployment field.

One status zone is, for example, defined as a normal operational zone within which there is no danger of the compressor conditions departing from the deployment field within a short period of time.

For example thereby, one solution envisages that a status zone in the form of at least one warning zone adjoining the deployment boundary be defined in the deployment field, and that the compressor monitoring system check as to whether the compressor condition lies within the at least one warning zone, whereupon the compressor monitoring system then sends a message to the interface if the compressor condition lies in the at least one warning zone A particularly advantageous solution envisages that status zones in the form of a plurality of warning zones adjoining the deployment boundary be defined in the deployment field, and that the compressor monitoring system check as to whether the compressor condition lies in one of the warning zones, whereupon the compressor monitoring system then sends a message in the form of a warning signal characterizing the respective warning zone to the interface if the compressor condition lies in one of the warning zones.

The advantage of this solution is to be seen in the fact that as a result of the sub-division into different warning zones, it is possible for a warning signal specific to a particular warning zone to be sent, this thereby indicating to the higher-level control system the warning zone within which the compressor condition momentarily lies so that the higher-level control system can react in a manner specific to that warning zone in order to prevent the compressor condition from leaving the deployment field.

In the previously described solutions, the warning zones could be located such as to be spaced from the deployment boundary.

It is particularly advantageous however, if the warning zones are defined as being directly adjacent to the deployment boundary in the deployment field so that the respective warning zones extend up to the respective deployment boundary.

In principle moreover, there is also a possibility of only providing a warning zone in those areas of the deployment field that adjoin one or more deployment boundary sections that are frequently exceeded.

A particularly expedient solution however envisages that at least one, and in particular a plurality of warning zones succeeding one another along the deployment boundary be arranged within the deployment boundary extending around the deployment field so that the compressor condition will fall into a warning zone before reaching each deployment boundary section whereupon the compressor monitoring system sends a message.

Hereby, the most diverse types of warning zone are conceivable as the warning zones.

For example, at least one or more of the warning zones defined in the following is provided as a warning zone:
a warning zone for a low first saturation temperature,
a warning zone for a high second saturation temperature,
a warning zone for a high first saturation temperature,
a warning zone for a low second saturation temperature,
a warning zone for a low first saturation temperature and a high second saturation temperature,
a warning zone for a high first saturation temperature and a low second saturation temperature,
a warning zone for a low first saturation temperature and a low second saturation temperature,
a warning zone for a high first saturation temperature and a high second saturation temperature.

As an alternative to detecting the position of the compressor condition in the deployment field, a further advantageous solution envisages that the compressor monitoring system determine the relative position of the determined compressor condition in the deployment field in the form of a spacing from the deployment boundary and sends it to the interface as a message.

Such a determination of the spacing of the compressor condition from the deployment boundary can be effected in the most varied of manners.

The all-embracing solution would be that, proceeding from the compressor condition, the deployment boundary in every direction of the deployment diagram be determined and the nearest spacing be sent.

A simplified solution however envisages that a determination of the spacing from at least one of the following deployment boundary sections be effected for determining the spacing of the compressor condition from the deployment boundary:
a deployment boundary section which corresponds to a first low saturation temperature,
a deployment boundary section which corresponds to a high second saturation temperature,
a deployment boundary section which corresponds to a high first saturation temperature,
a deployment boundary section which corresponds to a low second saturation temperature,
a deployment boundary section which corresponds to a low first saturation temperature and corresponds to a high second saturation temperature,
a deployment boundary section which corresponds to a high first saturation temperature and corresponds to a low second saturation temperature,
a deployment boundary section which corresponds to a high first saturation temperature and corresponds to a high second saturation temperature,
a deployment boundary section which corresponds to a low first saturation temperature and corresponds to a low second saturation temperature.

Moreover, a further advantageous embodiment of the compressor monitoring system envisages that it determine the temporal change in the spacing of the compressor condition from the deployment boundary.

The determination of the temporal change in the spacing from the deployment boundary has the advantage that there is then the possibility of recognizing the temporal behaviour of the compressor condition and in particular, recognizing the temporal behaviour of a change in the compressor condition so that the higher-level control system has the possibility of reacting in a timely manner in order to hold the compressor condition in the deployment field.

A further advantageous solution envisages that the compressor monitoring system determine a temperature of the lubricant in order to ensure that the lubricant does not become too hot and thereby strip away the lubricant film in the bearings for example.

In particular, provision is made for the compressor monitoring system to initiate a process of switching-off the refrigerant compressor if a lubricant limit temperature is exceeded.

For example, it would be conceivable to initiate the process of switching-off the refrigerant compressor immediately or following a delay.

However, in order to avoid having switching-off processes of this type insofar as possible, provision is preferably made for the compressor monitoring system to determine the relative spacing of the lubricant temperature from the lubricant limit temperature and in particular to send a message in the event that the lubricant limit temperature is approached.

For example, the spacing from the lubricant limit temperature can be determined in that, in the event of the lubricant temperature reaching a temperature range lying below the lubricant limit temperature, a lubricant temperature warning is sent by the compressor monitoring system to the interface for the higher-level control system.

Another possibility envisages that the compressor monitoring system determine the spacing of the lubricant temperature from the lubricant limit temperature and send it as a message to the interface.

A further advantageous embodiment of the solution in accordance with the invention envisages that the compressor monitoring system monitor a motor temperature and initiate a process of switching-off the refrigerant compressor in the event that a motor limit temperature is exceeded.

For the purposes of reducing the frequency at which a switching-off process occurs, provision is preferably made for the compressor monitoring system to send a motor temperature warning to the interface if the motor temperature reaches a temperature range lying below the motor limit temperature so that, if necessary, the higher-level control system is still able to initiate measures for lowering the motor temperature.

Another advantageous solution envisages that the compressor monitoring system detect a lubricant level and in the event of it falling below a lubricant lower limit, the compressor control system then initiates a process of switching-off the refrigerant compressor.

This, for example, is possible in that a minimum lubricant level detecting sensor is provided and in that the compressor control system initiates the process of switching-off the refrigerant compressor if this sensor detects that the lubricant level lies below a lubricant lower limit.

A further object of the invention is to provide a compressor monitoring system which enables improved operation of the refrigerant compressor.

This object is achieved by a compressor monitoring system in accordance with claim 21.

The advantage of this solution is that the frequency at which the refrigerant compressor switches off can be reduced thereby.

Further advantageous developments form the subject matter of claims 22 to 39.

Furthermore, the further object is also achieved by a method for monitoring a compressor in accordance with claim 40.

Further advantageous developments of the method form the subject matter of claims 41 to 56.

Further features and advantages of the invention form the subject matter of the following description as well as the graphic illustration of some exemplary embodiments.

DETAILED DESCRIPTION OF THE INVENTION

Figure 1:
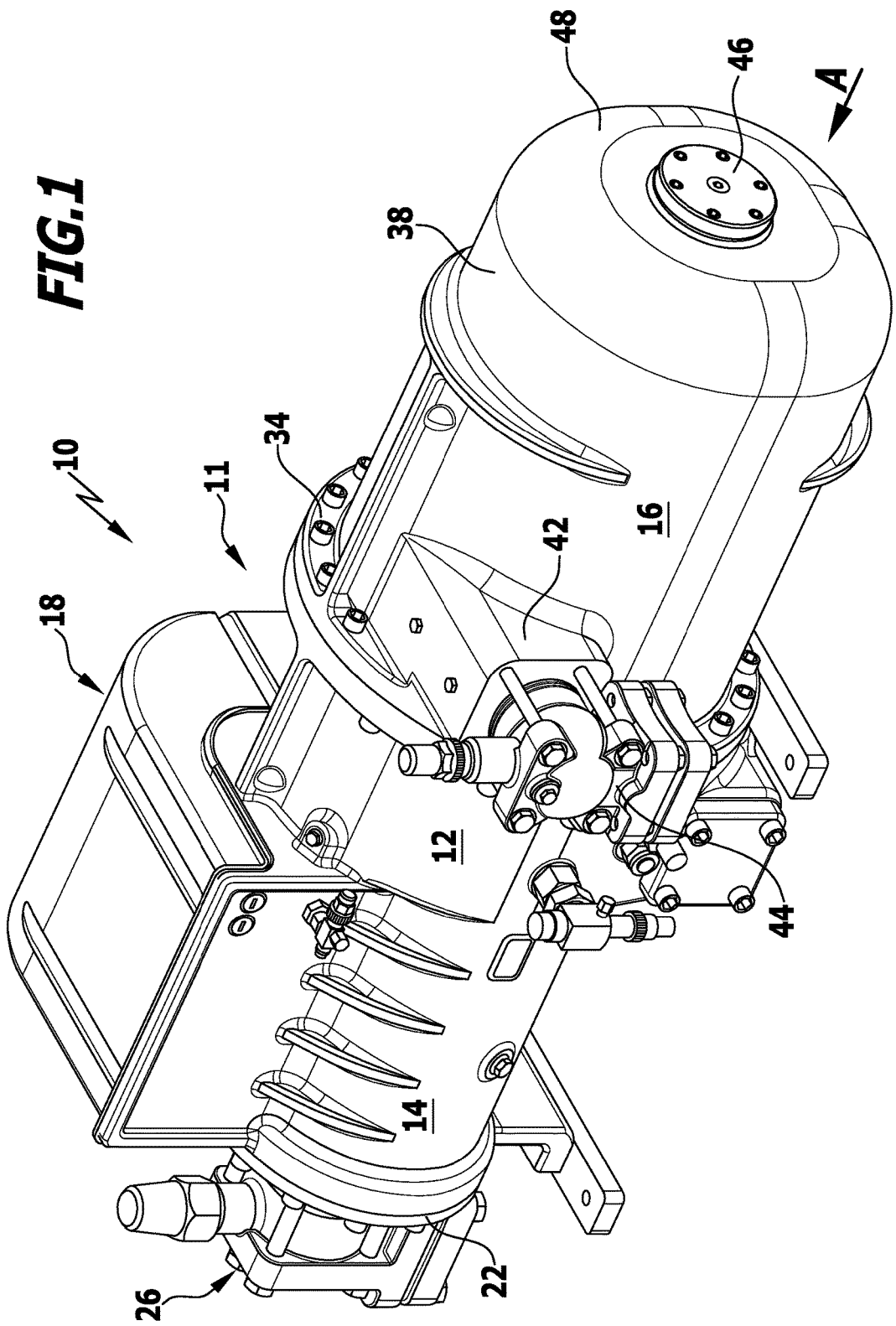
FIG. 1 shows a perspective view of a refrigerant compressor in accordance with the invention.
Figure 2:
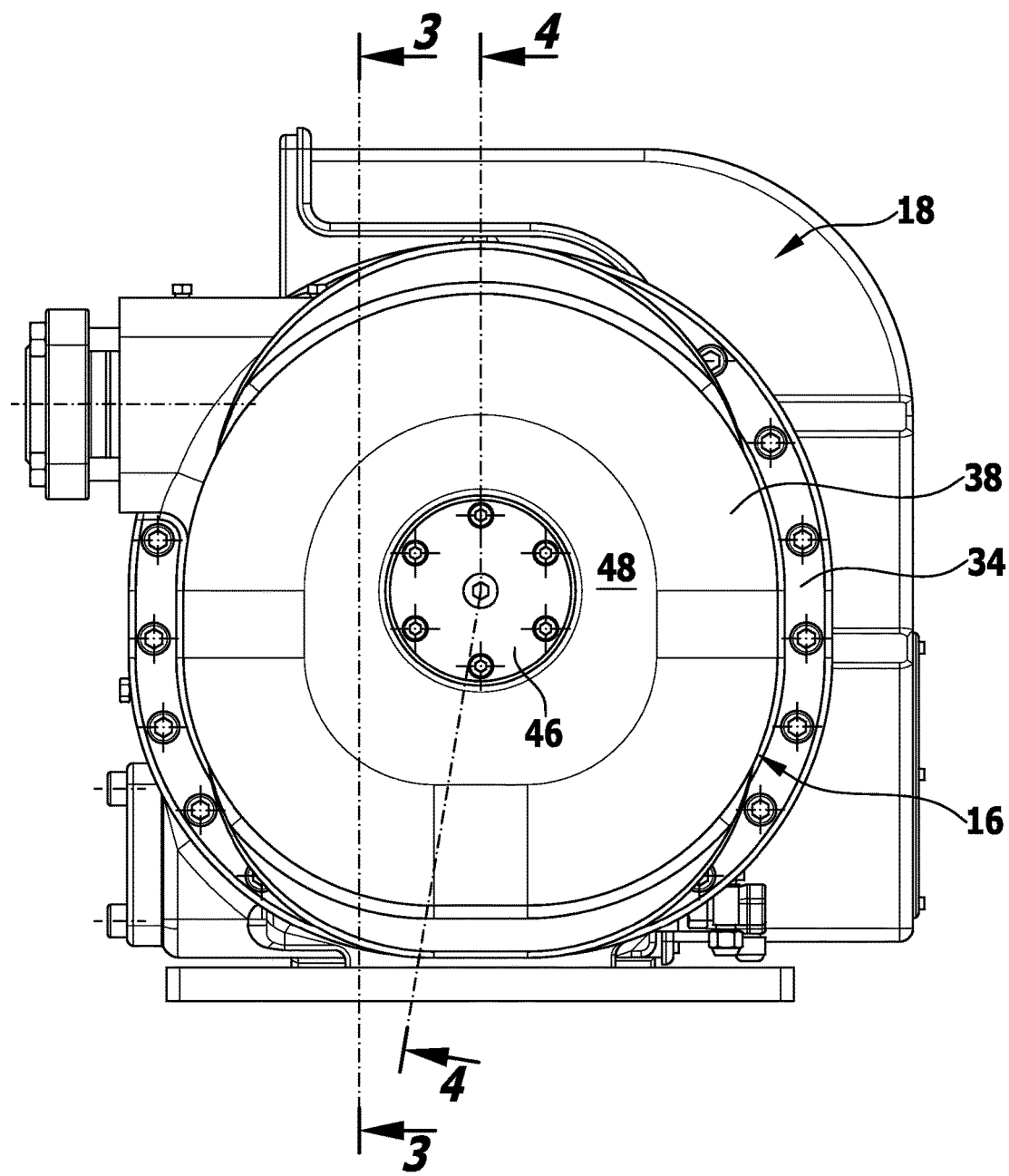
FIG. 2 a view in the direction of the arrow A in FIG. 1.
Figure 3:
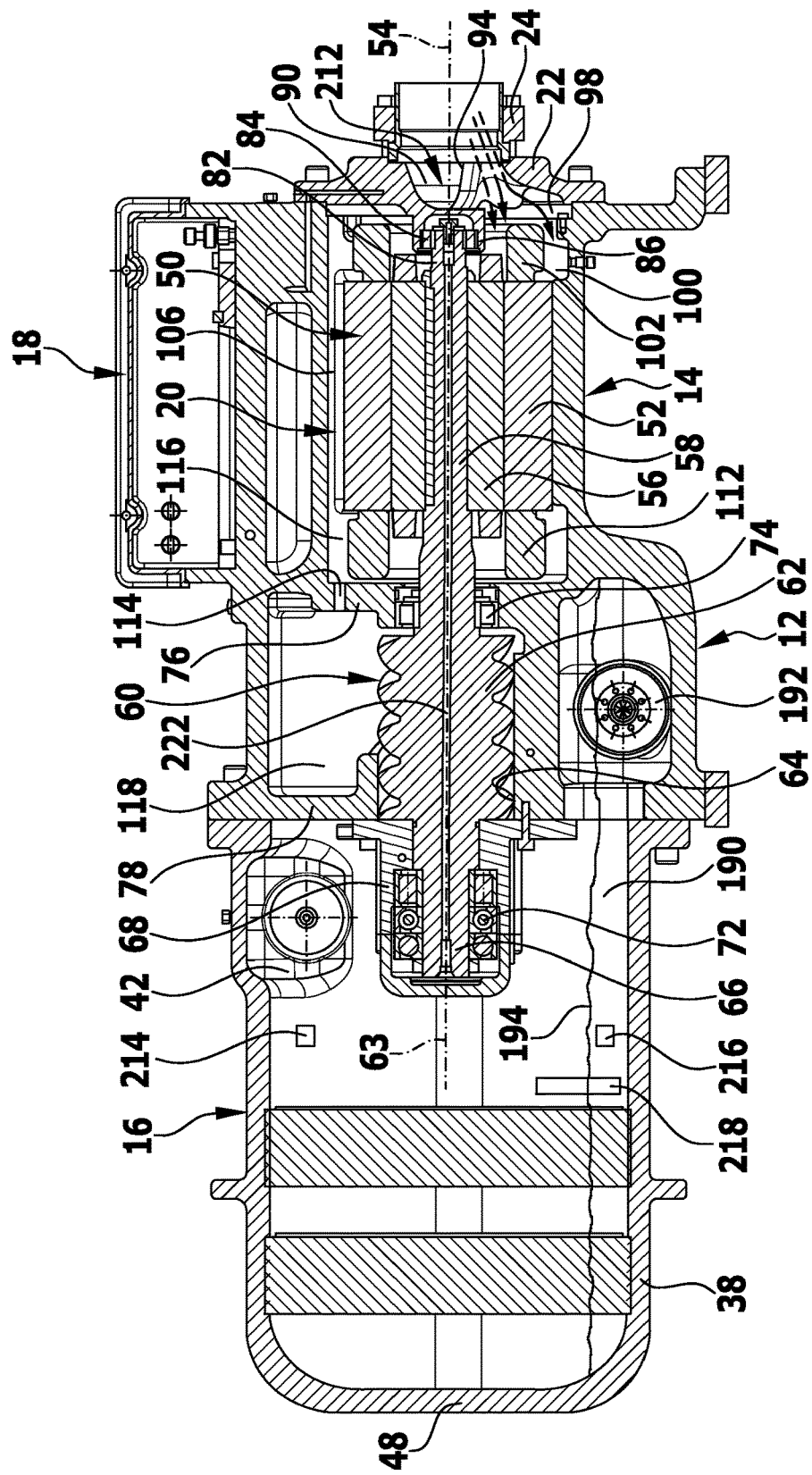
FIG. 3 a section along the line 3-3 in FIG. 2.

An exemplary embodiment of a refrigerant compressor 10 in accordance with the invention which is illustrated in FIGS. 1 to 3 comprises a common housing 11 which includes a compressor housing 12, a motor housing 14 arranged on a side of the compressor housing 12 and a pressure housing 16 arranged on a side of the compressor housing 12 opposite the motor housing 14. Hereby, the compressor housing 12, the motor housing 14 and the pressure housing 16 may be separate parts of the common housing 11 and are put together in order to form the latter or the compressor housing 12 and the motor housing 14 and/or the compressor housing 12 and the pressure housing 16 could be formed as connected parts.

Furthermore, the motor housing 14 carries a control system housing 18 in the region of a partial periphery.

As is illustrated in FIG. 3, the motor housing 14 surrounds a motor compartment 20 and is closed at the end thereof remote from the compressor housing 12 by an end face cover 22 which forms an end-face wall of the motor housing 14 and which, for its part, is provided with a suction gas connector 24 through which the refrigerant that is to be sucked to the refrigerant compressor is suppliable.

As is illustrated in FIG. 1, the suction gas connector 24 is preferably provided with a shut-off valve 26 which is connected to a suction gas line leading to the refrigerant compressor but is not illustrated in the drawings.

The pressure housing 16 is connected to the compressor housing 12 in releasable manner, namely, by means of a pressure housing flange 34 which is connectable to a mounting flange 36 of the compressor housing 12, whereby, commencing from the pressure housing flange 34, the pressure housing 16 extends in the form of a cylindrical capsule 38 that is closed at the end thereof by an end wall 48.

Furthermore, the pressure housing 16 carries a pressure outlet 42 on which a compressed-gas-side shut-off valve 44 is mountable.

Furthermore, the capsule 38 is preferably closed in accessible manner in the region of the end wall 48 thereof opposite the compressor housing 12 by an access cover 46 (FIG. 1).

As is illustrated in FIG. 3, an electric motor bearing the general reference 50 is seated in the motor housing 14, a stator 52 is arranged fixedly in the motor housing 14 and there is also a rotor 56 which is mounted rotatably about a motor axis 54 relative to the stator 52, wherein the rotor 56 is seated on a drive shaft 58.

The drive shaft 58 passes through the rotor 56 in the direction of the motor axis 54 on the one hand and extends into the compressor housing 12 of a screw-type compressor bearing the general reference 60 on the other.

In the region thereof extending within the compressor housing 12, the drive shaft 58 carries a compressor rotor 62 which is arranged in the compressor housing 12 in a compressor rotor boring 64 and is rotatable therein about a rotational axis 63 coinciding with the motor axis 54.

Moreover, the drive shaft 58 extends on the side thereof opposite the electric motor 50 beyond the compressor rotor 62 and forms an end section 66 which is rotatably mounted in a bearing housing 16 arranged within the pressure housing 68, wherein a set of bearings 72 is provided in the bearing housing 68 on the pressure-side for this purpose.

Furthermore, the drive shaft 58 is mounted between the compressor rotor 62 and the rotor 56 in a suction-side set of bearings 74 adjoining the suction-side of the compressor rotor 62.

For example, the suction-side set of bearings 74 is held on a suction-side wall 76 of the compressor housing 12, whilst the pressure-side set of bearings 72 is held on a pressure-side wall 78, wherein the bearing housing 68 is carried by the pressure-side wall 78 for this purpose.

For the purposes of accurately guiding the rotor 56 coaxially relative to the motor axis 54, the drive shaft 58 comprises another end section 82 which extends beyond the rotor 56 and which, for its part, is mounted in a guide bearing 84 that is seated in a bearing seating 86 arranged coaxially relative to the motor axis 54 and fixed to the motor housing 14, namely, close to the cover 22.

The bearing seating 86 could thus be supported directly on the motor housing 14 independently of the cover 22.

Preferably, as illustrated in FIG. 2, the bearing seating 86 is held on the cover 22, wherein the bearing seating 86 is held spaced from a cover base 92 by means of a plurality of bars.

Preferably, a suction gas filter 98 through which the suction gas must flow is arranged in an interior space 100 surrounding the bearing seating 86.

As illustrated in FIG. 3 by dashed lines, the suction gas flows from the shut-off valve 26 in a direction parallel to the motor axis 54 through the suction gas connector 24 and a suction opening 94 into an in-flow space 90 forming a suction inlet which is arranged between the suction opening 94 and the bearing seating 86.

From the in-flow space 90, a component of the suction gas running at an angle to the motor axis 54 then flows through the in-flow openings 96 into the interior space 100 thereby forming a plurality of flow paths, whereby suction-side head windings 102 of the stator 52 are subjected to a gas flow for example.

Preferably, the suction opening 94 is arranged in the cover 22 in such a manner that the motor axis 54 passes therethrough, and in particular, the suction opening 94 is arranged coaxially with respect to the motor axis 54 so that flow states that are approximately rotationally symmetrical with respect to the motor axis 54 develop in the region of the interior space 100 and the bearing seating 86.

Figure 10:
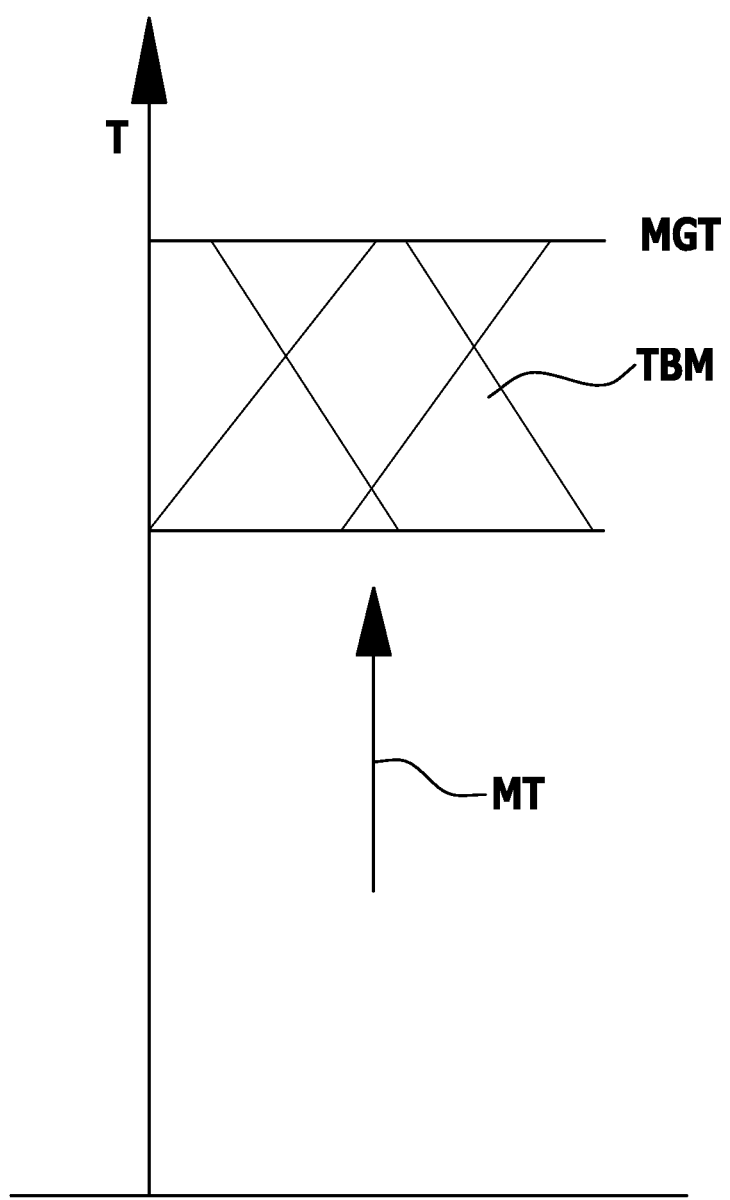

After flowing through the recesses 106 and the gap 108, the suction gas collects in the region of the head windings 112 of the stator 52 facing the compressor housing 12 in an interior space 116 of the motor housing 14 on the compressor housing side and is thus able to also cool these head windings 112 before the sucked-in gas or refrigerant passes through break-throughs 114 provided in the suction-side wall 76 of the compressor housing 12 as illustrated in FIG. 10, and thereby enters a suction space 118 of the compressor housing 12.

Figure 4:
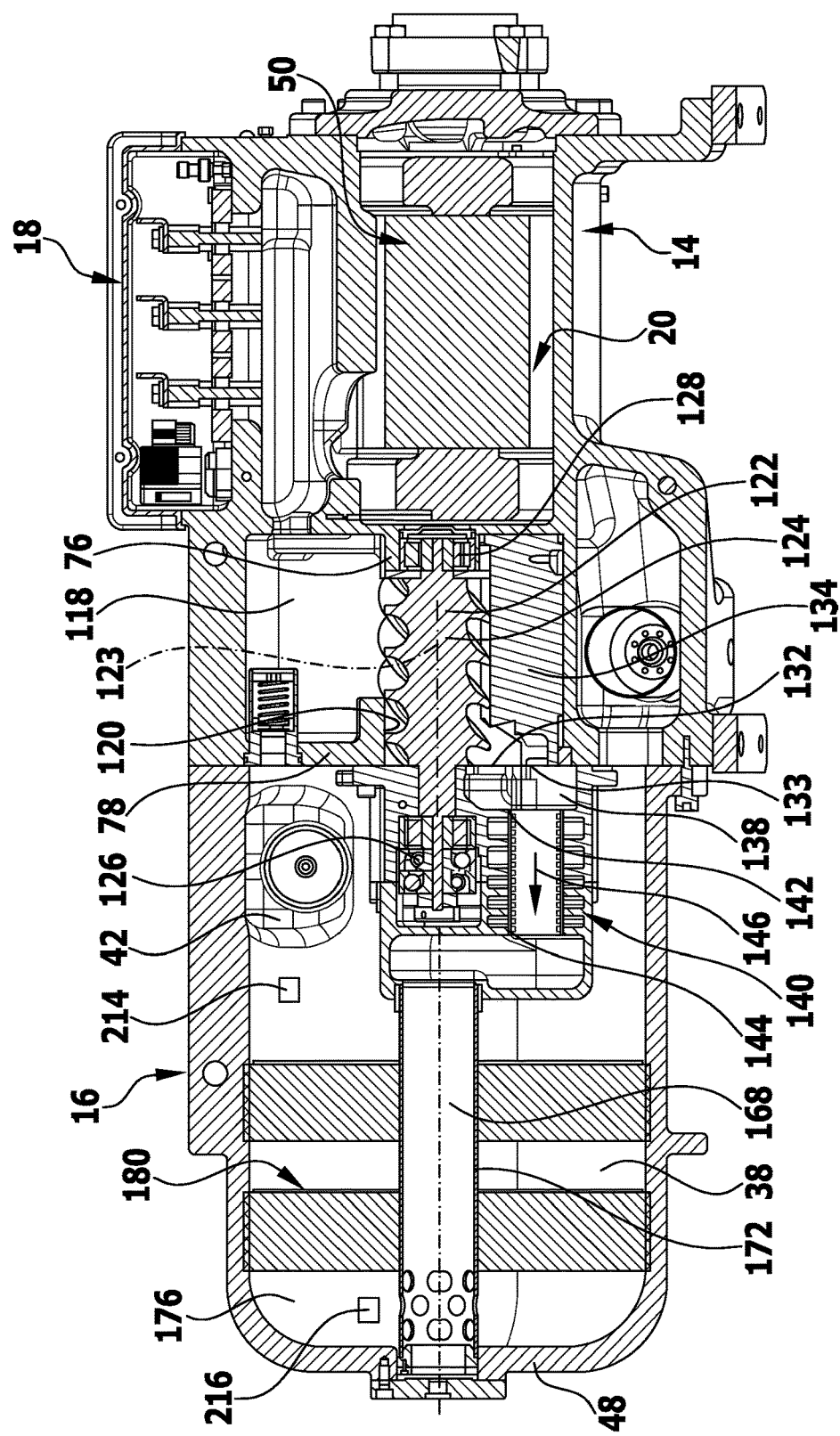
FIG. 4 a section along the line 4-4 in FIG. 2.

As illustrated in FIG. 3 and FIG. 4, apart from the first compressor rotor 62, provision is made for yet another, a second compressor rotor 122 which is arranged in a compressor rotor boring 120 and co-operates with the first one, wherein the second compressor rotor 122 is also mounted in a pressure-side set of bearings 126 about a rotational axis 123 that is parallel to the motor axis 54 and the rotational axis 63 by means of a bearing shaft 124 which extends beyond the compressor rotor 122 and is mounted in a suction-side set of bearings 128.

In operation, the two compressor rotors 62 and 122 now cooperate in such a manner that refrigerant or gas is sucked in from the suction space 118, compressed by the interengaging compressor rotors 62 and 122 and then, as a compressed gas or refrigerant, it exits into the compressor housing 12 in the region of a pressure-side outlet window 132 that is defined by the pressure-side free-standing peripheral regions and the end-face regions of the compressor rotors 62, 122 and passes on from the compressor housing 12 through a housing window 133 into the pressure housing 16.

Furthermore, for the purposes of adjusting the volume ratios, another slider gate valve 134 is provided, the construction and functioning of which are described in the German patent application 10 2011 051 730.8 for example.

In order to dampen the pressure pulsations of the compressed gas or refrigerant emerging through the outlet window 132, there is provided in the pressure housing 16 directly adjoining the housing window 133, a first sound absorber unit 140 which comprises a receiving chamber 138 that directly adjoins the housing window 132, an inlet opening 142 that is arranged on a side of the receiving chamber 138 opposite the housing window 132 and an outlet opening 144 through which a flow is able to take place, in particular, in a direction of flow 146 directed transversely to the pressure-side wall 78 and away therefrom, especially parallel to the motor axis 54.

Following the first sound absorber unit 140, there is for example, yet another, a second sound absorber unit 160 which comprises a transverse flow chamber 162 which directly adjoins the outlet opening 144 and through which the compressed gas or refrigerant emerging from the first sound absorber unit 140 can flow in a direction of flow 164 running transversely relative to the direction of flow 146 in the direction of an outlet 166 of the second sound absorber unit 160 from which the compressed gas or refrigerant is then fed in a channel 168, formed for example by a pipe 172, up to the end wall 48 of the capsule 38 where it emerges radially through openings 174 in the pipe 172 and enters the pressure space 176 of the pressure housing 16 enclosing the pipe 172.

Surrounding the channel 168 and in particular the pipe 172, there is arranged in the pressure space 176 of the pressure housing 16 a lubricant separating unit 180 which, for example, comprises two sets of porous gas-permeable structures 182 and 184, made of metal for example, which cater for the separation of lubricant spray from the pressurised gas or refrigerant.

After flowing through the lubricant separating unit 180, it is then possible for the pressurised gas or refrigerant to emerge from the pressure housing 16 through the pressure outlet 42.

The lubricant collecting in the lubricant separating unit 180 forms a lubricant bath 190 located, in the direction of the force of gravity, in the lower region of the pressure housing 16 and the compressor housing 12, and from there lubricant is taken, filtered by a filter 192 and then used for lubricating purposes (FIG. 3).

Figure 5:
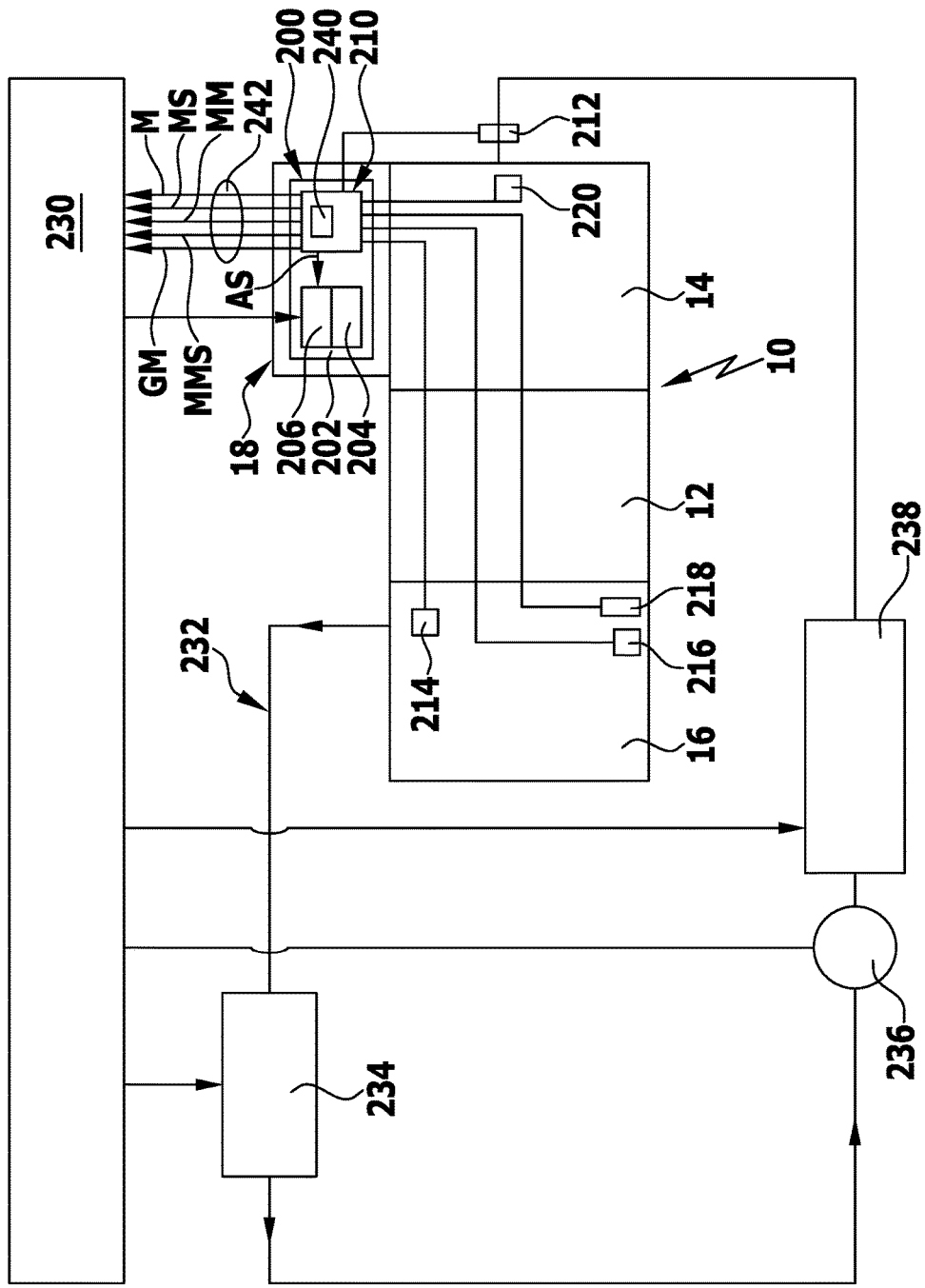
FIG. 5 a schematic illustration of a coolant circulation system incorporates a refrigerant compressor.

In the control system housing 18—as illustrated in FIG. 5—, there is provided a compressor control system which bears the general designation 200 and comprises a motor control system 202 incorporating a converter 204 and a converter control system 206, and there is also provided a compressor monitoring system 210 which detects a compressor condition.

To this end, the compressor monitoring system 210 is coupled to a pressure sensor 212 (FIGS. 3 and 5) which is arranged in the in-flow space 90 forming the suction inlet of the refrigerant compressor and detects a pressure in the suction inlet that is also referred to as the compressor input pressure which corresponds to a first saturation temperature S1 that may also be referred to as the evaporation temperature.

Furthermore, there is provided in the pressure housing 16 a pressure sensor 214 which is located close to the pressure outlet 42 for example and measures a pressure in the pressure outlet 42 which corresponds to a second saturation temperature S2 that may also be referred to as the liquefaction temperature.

In addition, the compressor monitoring system 210 also has another temperature sensor 216 associated therewith, this likewise being arranged in the pressure housing 16 and is used for measuring the lubricant temperature ST of the lubricant bath 190.

Moreover, the compressor monitoring system 210 has yet another temperature sensor 220 associated therewith, this being used to measure a motor temperature MT of the electric motor 50, at its head windings 102, 112 for example.

Finally, the compressor monitoring system 210 also has a lubricant level sensor 218 associated therewith, this being capable of detecting the quantity of lubricant in the lubricant bath 190 (FIGS. 3 and 5), wherein this process is effected either by detecting a mirror surface 194 of the lubricant bath 190 or, in the simplest case, is effected in that the lubricant level sensor 218 merely detects whether the lubricant bath 190 exceeds a minimum lubricant level (FIG. 5).

Figure 6:
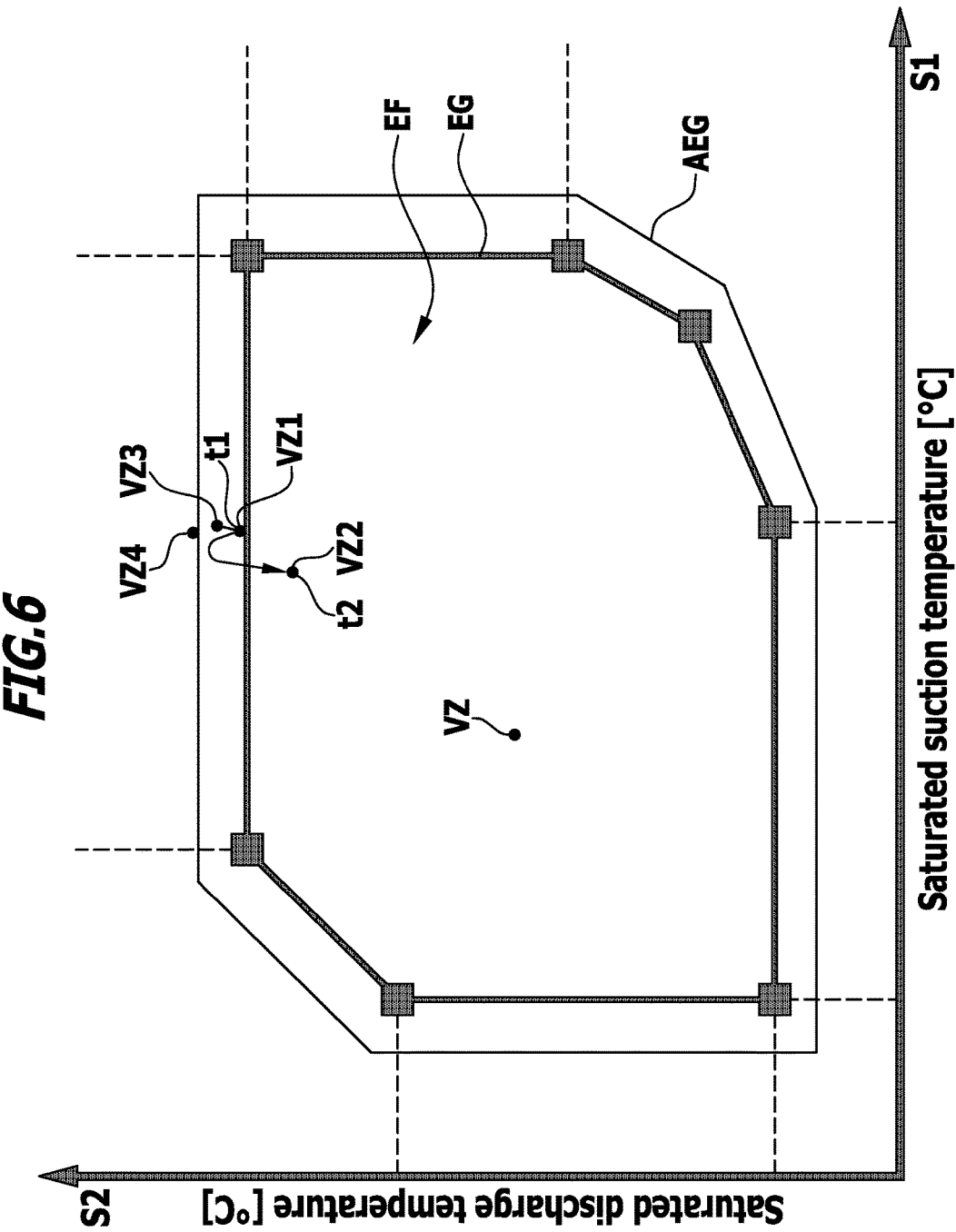
FIG. 6 an illustration of a deployment field of compressor conditions in a deployment diagram in a first embodiment.

From the values of the pressure sensors 212 and 214, the compressor monitoring system 210 now determines a compressor condition VZ which is defined by the first saturation temperature (51) in the suction inlet 90 and the second saturation temperature S2 in the pressure outlet 42, which condition must lie within a deployment field EF that is enclosed by a deployment boundary EG in a deployment diagram which is illustrated in FIG. 6 in order to enable damage-free operation of the refrigerant compressor 10, wherein the first saturation temperature S1 at the suction inlet 90 is plotted along the x axis and the second saturation temperature S2 at the pressure outlet 42 is plotted along the y axis (FIG. 6).

Deployment diagrams for refrigerant compressors of this type are described for example in the book "Lexikon der Kältetechnik" by Dieter Schmidt (Hrsg) published by C F. Mueller to which reference is made in regard thereto.

All of the compressor conditions VZ which lie in the deployment field EF within the deployment boundary EG thus represent permitted compressor conditions VZ that are harmless for operation of the refrigerant compressor, and under these conditions, operation of the refrigerant compressor 10 may be effected by the operator.

Hereby, the deployment boundary EG represents a closed bounding border of the deployment field EF so that the deployment field EF is unambiguously defined in the deployment diagram, When the current refrigerant compressor 10 is running, the compressor monitoring system 210 now determines continuously or possibly at given time intervals the compressor condition VZ and compares the determined compressor condition VZ with the compressor conditions VZ permitted by the deployment field EF.

If the compressor monitoring system 210 establishes that the compressor condition VZ of the refrigerant compressor has wandered out of the deployment field EF and lies outside the deployment boundary EG such as the compressor condition VZ1 for example, then the compressor monitoring system 210 initiates a process of switching-off the refrigerant compressor 110, in particular, by switching-off the electric motor 50. In the simplest case, this switching-off process may be an immediate switch-off process or it could be a delayed switching-off process at the expiry of a delay period Δt.

In the case of a delayed switching-off process, the compressor monitoring system 210 determines the time point t1 at which the deployment boundary EG was overstepped and delivers over an interface 242 a boundary message GM to a higher-level control system 230 for a refrigerant circulation system 232 in which the refrigerant compressor in accordance with the invention 10 is being operated and which, following on from the refrigerant compressor 10 in the refrigerant circulation system 232, comprises a liquefier 234 an expansion valve 236 and an evaporator 238 which are controllable by the higher-level control system 230.

If the higher-level control system 230 is in the position of intervening rapidly in the refrigerant circulation system 232, then the possibility exists for the compressor condition VZ1 to change back again to a compressor condition VZ2 which again lies within the deployment field EF, whereupon a process of switching-off the refrigerant compressor 10 does not take place if the transition to the compressor condition VZ2 has taken place at a time point t2 whose separation in time from the time point t1 is smaller than the delay period Δt.

However, if the compressor condition VZ1 remains outside the deployment field EF or if, after a certain time, it changes to a compressor condition VZ3 which lies still further outside the deployment field EF, then the process of switching-off the refrigerant compressor 10 takes place at the expiry of the delay period Δt, whereby, for this purpose, the compression monitoring system 210 conveys a switch-off signal AS to the motor control system 202.

The deployment boundary EG in the deployment diagram of FIG. 6 may itself be enclosed by an absolute deployment boundary AEG which runs outside the deployment field EF and outside the deployment boundary EG at a spacing from the deployment boundary EG. In this case, the compressor monitoring system 210 works in such a way that if the compressor condition VZ4 lies outside the absolute deployment boundary AEG then an immediate process of switching-off the refrigerant compressor 10 takes place without further delay by means of the issuance of the switch-off signal AS from the compressor monitoring system 210.

This means for example, that even if at first only the compressor condition VZ1 lies outside the deployment boundary EG but the compressor condition VZ4 is reached before the expiry of the delay period Δt, then an immediate process of switching-off the refrigerant compressor 10 by the issuance of the switch-off signal AS takes place before expiry of the delay period Δt.

In the solution in accordance with the invention, the deployment field EF, the deployment boundary EG and the absolute deployment boundary AEG are set by the factory on a compressor-specific basis such as to be unchangeable by the user and fixedly stored in a memory 240 associated with the compressor monitoring system 210 so that a user of the refrigerant compressor 10 in accordance with the invention cannot affect the position of the deployment boundary EG and the absolute deployment boundary AEG, but, during use of the refrigerant compressor 10 in accordance with the invention, works in the deployment field EF laid down by the manufacturer and it can thereby be ensured that the refrigerant compressor 10 will not suffer damage when in operation.

Thus the first embodiment of the compressor monitoring system 210 described in connection with FIG. 6 only reacts when the deployment boundary EG or the absolute deployment boundary AEG is exceeded so that even upon the issuance of the border message GM, the higher-level control system 230 cannot repeatedly control the refrigerant circulation system 232 in such a way that the process of switching-off the refrigerant compressor 10 will be prevented.

For this reason, provision is advantageously made in a second improved embodiment of the compressor monitoring system 210 for the compressor monitoring system 210 to detect the relative position of the compressor condition VZ in the deployment field EF relative to the deployment boundary EG.

Thereby, this process for detecting the compressor condition VZ within the deployment field EF relative to the deployment boundary EG can be effected in the most varied of manners.

Figure 7:
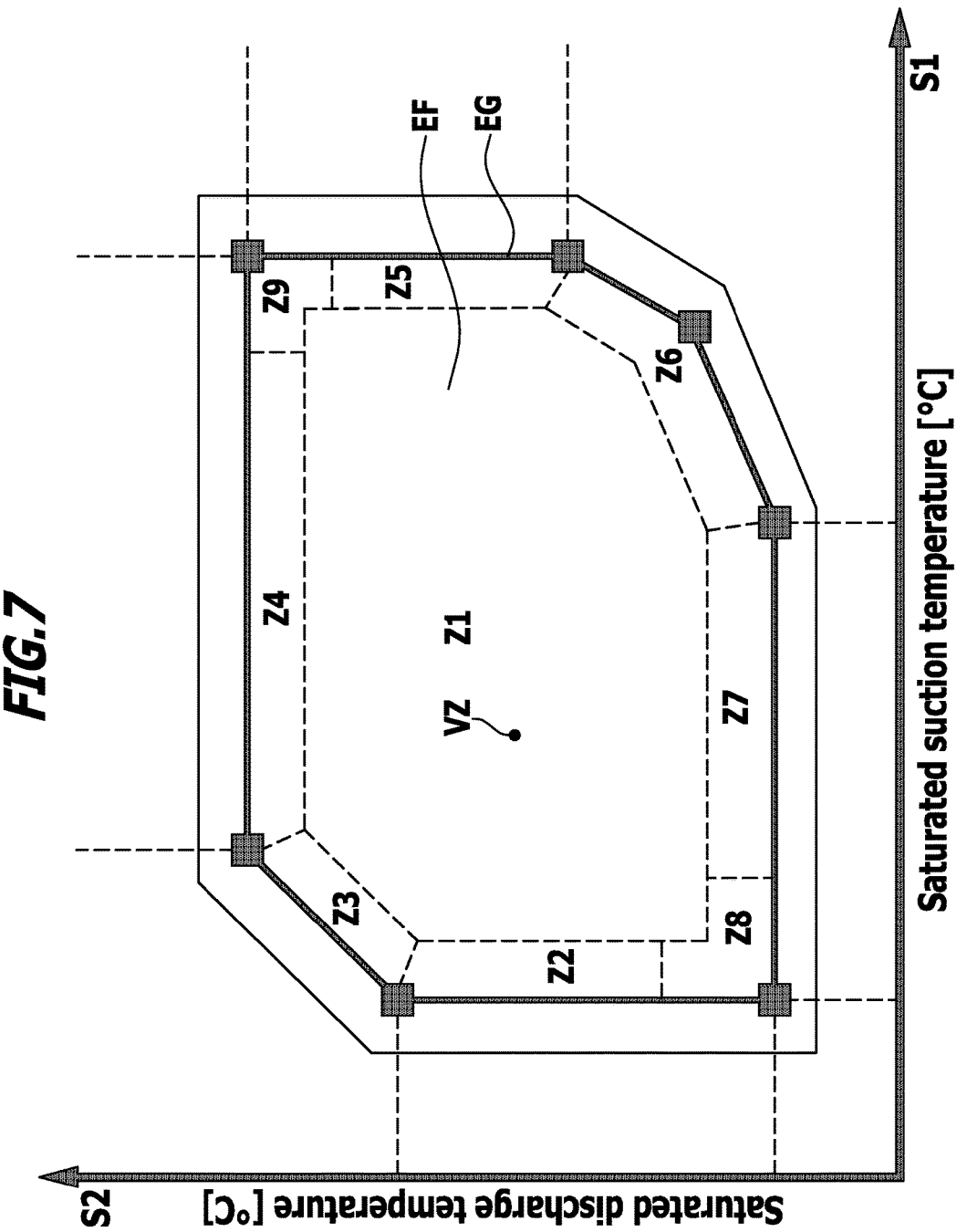
FIG. 7 an illustration similar to FIG. 6 of an exemplary implementation of a second embodiment.

In a first exemplary embodiment that is illustrated in FIG. 7, a plurality of status zones are defined within the deployment field EF, the status zones Z1 to Z9 for example. Here, the status zone Z1 represents a zone in which no reaction of the compressor monitoring system 210 is necessary because all the compressor conditions V2 are located within the status zone Z1 well away from the deployment boundary EG so that the higher-level control system 230 does not have to consider the compressor condition VZ during operation of the refrigerant circulation system 232.

Thus, if the compressor monitoring system 210 determines that the compressor condition VZ lies within the status zone Z1, then no measures are necessary on the part of the compressor monitoring system 210. The status zone Z1 is therefore referred to as the normal operating zone.

In contrast thereto, the status zones Z2, Z3, Z4, Z5, Z6, Z7, Z8 and Z9 are located within the deployment field EF directly adjacent the deployment boundary EG and represent warning zones, i.e. if the compressor condition VZ lies within one of these warning zones Z2, Z3, Z4, Z5, Z6, Z7, Z8 and Z9, then the compressor monitoring system 210 will always send a message M via the interface 242 to the higher-level control system 230.

However, as a uniform message M for all the warning zones Z2 to Z9 would not indicate to the higher-level control system 230 the particular side of the deployment boundary EG that the compressor condition VZ is approaching, the warning zones Z2 to Z9 define mutually separate warning zones in one exemplary embodiment so that differing warning signals W2 to W9 will be delivered as a message M in dependence on the warning zone Z2 to Z9 into which the compressor condition VZ has entered.

For example, if the compressor condition VZ occurs in the warning zone Z2, then a warning signal W2 is sent which conveys the information to the higher-level control system 230 that the first saturation temperature S1 at the suction inlet 90 is low so that in the event of further lowering of the first saturation temperature S1 the danger exists that the compressor condition VZ will over-step the deployment boundary EG in the direction of too low a first saturation temperature.

Consequently, the higher-level control system 230 is then in a position to initiate the necessary measures for increasing the first saturation temperature S1.

Measures of this type which the higher-level control system 230 can initiate in the refrigerant circulation system are, for example, an increase of the compressor power or an increase in the mass flow.

By contrast, if the compressor condition VZ occurs in the warning zone Z3 then the warning signal W3 is sent which conveys to the higher-level control system 220 that the first saturation temperature S1 at the suction inlet 90 is low and the second saturation temperature S2 at the pressure outlet 42 is high.

In this case too, the higher-level control system 230 can initiate the necessary measures, for example, reducing the compressor power, lowering the temperature of the liquefier 234 or possibly defrosting the evaporator 238.

Should the compressor condition VZ enter the warning zone Z4, then the warning signal W4 is sent which conveys to the higher-level control system 220 that although the first saturation temperature S1 at the suction inlet 90 is correct, the second saturation temperature S2 at the pressure outlet 42 is high.

In this case, the higher-level control system 230 has the possibility of either reducing the compressor power or lowering the temperature of the liquefier 234.

Should the compressor condition VZ enter the warning zone Z5, then the warning signal W5 is sent. By virtue of this warning signal W5, the higher-level control system 230 is informed that the first saturation temperature S1 at the suction inlet 90 is high, although the second saturation temperature at the pressure outlet 42 lies within the tolerable range.

Upon entry of the compressor condition VZ into the warning zone Z6, the warning signal W6 is emitted which conveys to the higher-level control system 230 that the first saturation temperature S1 in the suction inlet 90 is high and the second saturation temperature S2 at the pressure outlet 42 is low.

For the case where the compressor condition VZ enters the warning zone Z7, the higher-level control system 230 is informed that the first saturation temperature S1 in the suction inlet 90 lies in a tolerable range, but that the second saturation temperature S2 in the pressure outlet 42 is low.

The warning zones Z2 and Z7 could border each other.

In order to obtain even better information about the compressor condition VZ in the border area between the warning zone Z2 and the warning zone Z7, there is provided the warning zone Z8, whereby if the compressor condition VZ occurs therein, the warning signal W8 is sent which conveys to the higher-level control system 230 that the first saturation temperature S1 and the second saturation temperature S2 are low.

Finally, an additional warning zone Z9 may also be provided between the warning zone Z4 and the warning zone Z5 so that should the compressor condition VZ occur therein, the warning signal W9 is sent which advises of a high first saturation temperature S1 and a high saturation temperature S2.

Figure 8:
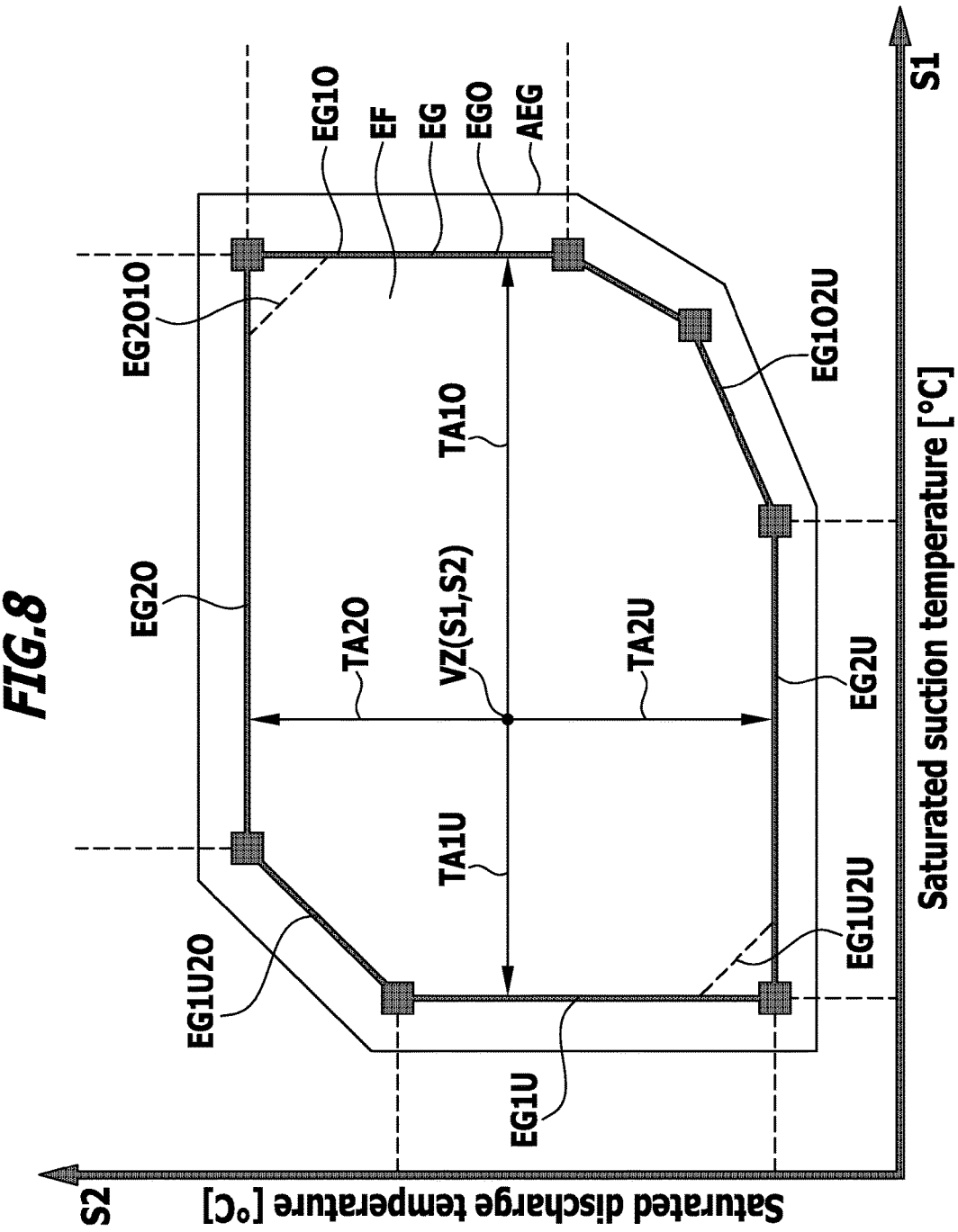
FIG. 8 an illustration similar to FIG. 6 of a further exemplary implementation of the second embodiment.

As an alternative or in addition to the functioning of the compressor monitoring system in accordance with the invention described thus far, provision is made in a second exemplary embodiment that is illustrated in FIG. 8 for the compressor monitoring system 210 to determine the spacing TA from the deployment boundary EG in the case of every compressor condition VZ lying in the deployment field EF within the deployment boundary EG.

This is effected for example in that the compressor condition VZ of individual deployment boundary sections EG1U, EG2O, EG1O or else EG1U2O or EG1O2U of the deployment boundary EG have a spacing TA which defines the relative position of the compressor condition VZ with respect to the deployment boundary EG.

These relative spacings TA of the respective compressor condition VZ are indicated, in the case of the direction parallel to the axis S1 of the deployment diagram for example, as spacing TA1U, i.e. the temperature difference to the lower deployment boundary EG1U, and as spacing TA1O, i.e. the temperature difference to the upper deployment boundary EG1O.

Furthermore, the compressor monitoring system 210 determines the relative spacing of the respective compressor condition VZ from the lower deployment boundary EG2U as spacing TA2U and the relative spacing from the upper deployment boundary EG2O as spacing TA2O in the case of the direction parallel to the axis S2 of the deployment diagram.

This means that the compressor monitoring system 210 generates four spacing values TA1U, TA1O, TA2U and TA2O for example and conveys them constantly or at time intervals in the form of a message M to the higher-level control system 230 so that, on the basis these spacing values TA1U, TA1O, TA2U, TA2O, the higher-level control system 230 is itself in a position to determine whether the compressor condition VZ is approaching the deployment boundary EG or is sufficiently far enough away therefrom. When processing these spacing values independently, the higher-level control system 230 is in a position, in accord with the inertial parameters of the refrigerant circulation system 232 in which the refrigerant compressor in accordance with the invention 10 is incorporated, to take timely measures for preventing the compressor condition VZ from over-stepping the deployment boundary EG before the compressor condition VZ actually reaches the deployment boundary EG.

As an alternative or in addition thereto however, there is also the possibility in this exemplary embodiment of detecting the relative spacing of the compressor condition VZ from the deployment boundary EG even more precisely, for example, by additionally detecting yet another spacing from a deployment boundary section EG1U2O which runs between the deployment boundary section EG1U and EG2O, or else additionally detecting yet another spacing from a deployment boundary section EG1O2U which runs between the deployment boundary section EG1O and the deployment boundary section EG2U, or detecting a spacing from a deployment boundary section EG1U2U or from a deployment boundary section EG2O1O.

Moreover, it is also possible for the compressor monitoring system 210 itself to determine not just the spacings TA but also the temporal change of the spacings TA in order to thereby detect alterations in the compressor condition VZ with respect to time and, in this context, to likewise convey yet more information regarding the temporal changes in the compressor condition VZ to the higher-level control system 230 so that the latter is in a still better position to prevent the compressor condition VZ reaching the deployment boundary EG by timely control of the refrigerant circulation system 232 incorporating the refrigerant compressor 10, the liquefier 234, the expansion valve 236 and the evaporator 238.

Furthermore, the compressor monitoring system 210 also monitors the temperature ST of the lubricant bath 190 with the aid of the temperature sensor 216.

Figure 9:
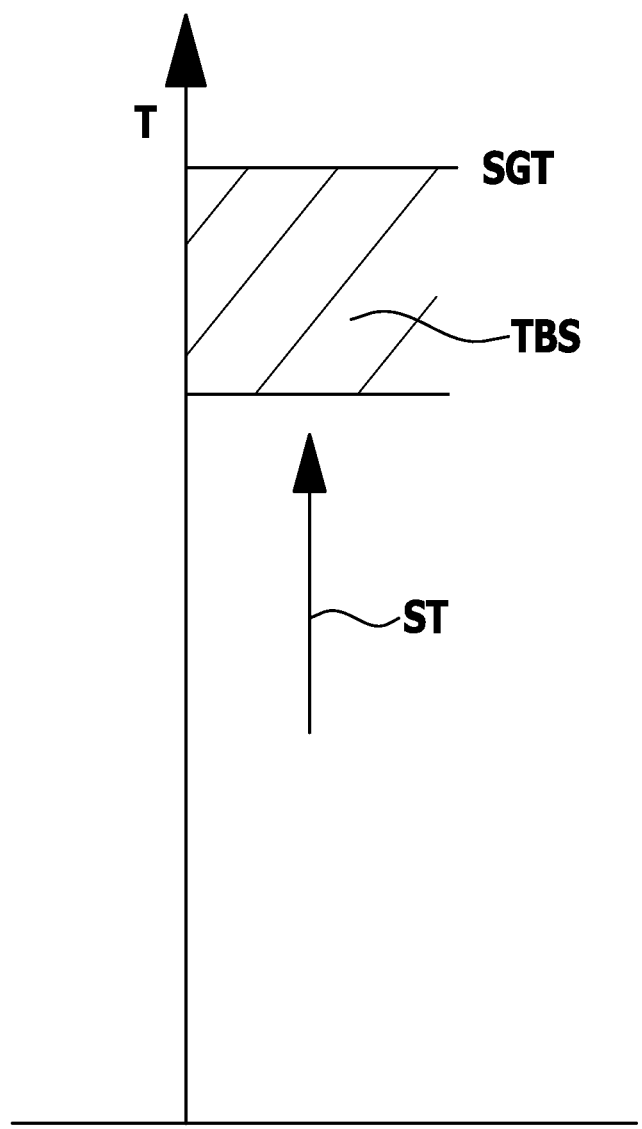
FIG. 9 a schematic illustration of a system for monitoring lubricant temperature and FIG. 10 a schematic illustration of a system for monitoring motor temperature.

For this purpose as is illustrated in FIG. 9, a lubricant limit temperature SGT is stored in the memory 240, the compressor monitoring system 210 comparing the lubricant temperature ST therewith.

Thereby, if the lubricant temperature ST exceeds the lubricant limit temperature SGT, then the process of switching-off the refrigerant compressor 10 is triggered immediately, namely, in that the compressor monitoring system 210 sends the switch-off signal AS.

In order not to open up the possibility of the higher-level control system 230 initiating timely measures for the reduction of the lubricant temperature ST prior to the lubricant limit temperature SGT being exceeded by the lubricant temperature ST, there is provided a temperature range TBS below the lubricant limit temperature SGT with which the compressor monitoring system 210 likewise compares the lubricant temperature ST.

If the compressor monitoring system 210 determines that the lubricant temperature ST has reached the temperature range TBS, then the compressor monitoring system 210 generates a message MS which conveys this information to the higher-level control system 230 via the interface 242 so that the higher-level control system 230 can react accordingly.

Moreover, the compressor control system 210 also monitors the motor temperature MT of the electric motor 50.

This motor temperature MT is compared with a motor limit temperature MGT which is stored in the memory 240, and the compressor monitoring system 210 then triggers the process of switching-off the refrigerant compressor 10 by emitting the switch-off signal AS if the motor temperature MT exceeds the motor limit temperature MGT.

In order to open up the possibility for the higher-level control system 230 to react if necessary to a rise of the motor temperature MT into a range close to the motor limit temperature MGT, there is provided a temperature range TBM below the motor limit temperature MGT which is likewise fixedly defined and stored in the memory 240.

In like manner, the compressor monitoring system 210 compares the motor temperature MT with the temperature range TBM and then triggers the sending of a message MM if the motor temperature reaches the temperature range TBM or lies within it, said message conveying the information to the higher-level control system 230 that the motor temperature MT now lies close to the motor limit temperature MGT so that the higher-level control system 230 still has the possibility of reacting if necessary in order to lower the motor temperature MT.

Moreover, the compressor monitoring system 210 also monitors the quantity of the lubricant by means of the lubricant level sensor 218.

For example, the lubricant level sensor 218 can work in such a way that it detects whether the lubricant bath exceeds the minimum lubricant level and, for the case where this is not so, it triggers the message MMS and conveys it to the higher-level control system 230.

After transmission of the message MMS, the process of switching-off the refrigerant compressor 10 by the switch-off signal AS can also be triggered off if necessary.

There is also the possibility of switching-off the refrigerant compressor 10 by means of the switch-off signal AS as soon as the lubricant bath 190 falls below the minimum lubricant level.

If the lubricant level sensor 218 is working in such a way that it continuously detects the lubricant level in the lubricant bath 190, then the message MMS can likewise be sent in good time to the higher-level control system 230 before the minimum lubricant level is reached as the lubricant level approaches the minimum lubricant level so that an indication can be given to the operator of the refrigerant circulation system 232 that maintenance is necessary.

During a start-up phase of the refrigerant compressor 10 in all the exemplary embodiments and the embodiments, provision may be made for the compressor monitoring system 210 not to initiate the process of switching-off the drive motor 50 and not sending information to the higher-level control system 230 in order to enable the refrigerant compressor 10 to reach a compressor condition VZ in the deployment field EF in current-free manner.

Once the compressor condition VZ has reached the deployment field EF, the compressor monitoring system can then implement the previously described functions.

The invention claimed is:

1. A method for monitoring a refrigerant compressor comprising a drive motor and
   a compressor unit which compresses a refrigerant entering through a suction inlet and allows it to exit through a pressure outlet, and a compressor monitoring system which is integrated into a compressor control system for the compressor, the compressor control system being part of the refrigerant compressor and determining a compressor condition by means of a first condition value that corresponds to a first saturation temperature in the suction inlet and a second condition value that corresponds to a second saturation temperature in the pressure outlet,
   said method comprising the following steps:
   presetting a deployment field of a deployment diagram, the deployment field incorporating the permissible compressor conditions in a compressor-specific manner, storing the preset deployment field in said compressor monitoring system of the compressor control system,
   determining the compressor condition by detecting the first condition value which corresponds to the first saturation temperature in the suction inlet and the second condition value which corresponds to the second saturation temperature in the pressure outlet,
   comparing the compressor condition with permissible compressor conditions lying in the stored deployment field of the deployment diagram,
   initiating a process of switching-off the refrigerant compressor if the compressor condition departs from the deployment field, the compressor monitoring system cooperating directly with a motor control system of the compressor control system for the purposes of switching-off the drive motor,
   determining the relative position of the determined compressor condition with reference to a deployment boundary enclosing the deployment field, and
   making available the information about the relative position of the compressor condition at a control interface for a higher-level control system of a refrigerant circulation system;
   wherein initiating the process of switching-off is a delayed switching-off process according to which the monitoring system determines a first time point at which the deployment boundary was overstepped, and if after a delay period the compressor condition is still outside the deployment field, the compressor monitoring system conveys a switch-off signal to the motor control system.

2. A method in accordance with claim 1, wherein determining the relative position of the determined compressor condition with reference to a deployment boundary enclosing the deployment field further comprises:
   defining status zones in the deployment field, and
   checking as to whether the compressor condition lies in one of these status zones or not.

3. A method in accordance with claim 2, further comprising:
   defining the status zones in the form of at least one warning zone adjoining the deployment boundary in the deployment field,
   checking as to whether the compressor condition lies in the at least one warning zone,
   sending a message M to the interface if the compressor condition lies in the at least one warning zone.

4. A method in accordance with claim 2, further comprising:
   defining the status zones in the form of a plurality of warning zones adjoining the deployment boundary in the deployment field,
   checking as to whether the compressor condition lies in one of the warning zones,
   sending a message M in the form of a warning signal characterizing the respective warning zone to the interface if the compressor condition lies in one of the warning zones.

5. A method in accordance with claim 2, further comprising:
   arranging at least one warning zone extending along the deployment boundary within the deployment boundary surrounding the deployment field.

6. A method in accordance with claim 2, further comprising:
   providing at least one of the warning zones defined in the following as a warning zone:
   a warning zone for a low first saturation temperature,
   a warning zone for a high second saturation temperature,
   a warning zone for a high first saturation temperature,
   a warning zone for a low second saturation temperature,
   a warning zone for a low first saturation temperature and a high second saturation temperature,
   a warning zone for a high first saturation temperature and a low second saturation temperature,
   a warning zone for a low first saturation temperature and a low second saturation temperature,
   a warning zone for a high first saturation temperature and a high second saturation temperature.

7. A method in accordance with claim 1, further comprising:
   determining the relative position of the determined compressor condition in the deployment field in the form of a relative spacing from the deployment boundary, and
   sending the relative position of the determined compressor condition in the deployment field in the form of the relative spacing from the deployment boundary to the interface in the form of a message.

8. A method in accordance with claim 7, wherein determining the spacing of the compressor condition from the deployment boundary further comprises:
determining a spacing from at least one or more of the following deployment boundary sections:
a deployment boundary section which corresponds to a first low saturation temperature,
a deployment boundary section which corresponds to a high second saturation temperature,
a deployment boundary section which corresponds to a high first saturation temperature,
a deployment boundary section which corresponds to a low second saturation temperature,
a deployment boundary section which corresponds to a low first saturation temperature and a high second saturation temperature,
a deployment boundary section which corresponds to a high first saturation temperature and a low second saturation temperature,
a deployment boundary section which corresponds to a low first saturation temperature and corresponds to a low second saturation temperature,
a deployment boundary section which corresponds to a high first saturation temperature and corresponds to a high second saturation temperature.

9. A method in accordance with claim 7, further comprising:
determining the temporal change of the spacing of the compressor condition from the deployment boundary.

10. A method in accordance with claim 1, further comprising:
detecting a lubricant temperature, and
initiating a process of switching-off the refrigerant compressor if a lubricant limit temperature is exceeded.

11. A method in accordance with claim 10, further comprising:
determining the spacing of the lubricant temperature from the lubricant limit temperature, and
sending a message particularly in the event of an approach to the lubricant limit temperature.

12. A method in accordance with claim 11, further comprising:
sending a lubricant temperature warning to the interface for the higher-level control system if the lubricant temperature reaches a temperature range lying below the lubricant limit temperature.

13. A method in accordance with claim 11, further comprising:
determining the spacing of the lubricant temperature from the lubricant limit temperature and wherein the spacing is sent in the form of a message to the interface.

14. A method in accordance with claim 1, further comprising:
monitoring a motor temperature, and
switching off the refrigerant compressor upon a motor limit temperature being exceeded.

15. A method in accordance with claim 14, further comprising:
sending a motor temperature warning to the interface if the motor temperature reaches a temperature range lying below the motor limit temperature.

16. A method in accordance with claim 1, further comprising:
detecting a lubricant level, and
initiating a process of switching-off the refrigerant compressor by the compressor monitoring system if the level falls below a lubricant limit.

17. A method in accordance with claim 1, further comprising:
presenting the deployment field that incorporates the permissible compressor conditions in compressor-specific manner.

18. A method in accordance with claim 1, wherein at the first time point the compressor monitoring system delivers a boundary message to a higher level control system.

19. A method in accordance with claim 1, wherein the deployment boundary of the deployment diagram is enclosed by an absolute deployment boundary which runs outside the deployment field and outside the deployment boundary at a spacing from the deployment boundary, and if the compressor condition lies outside said absolute deployment boundary, the switching-off signal is issued from the compressor monitoring system without delay.

* * * * *